Feb. 1, 1966          G. DOSAMANTES DE JOSÉ ETAL          3,232,271
                        INTEGRAL UNITARY AQUARIUM
                        Filed March 16, 1964
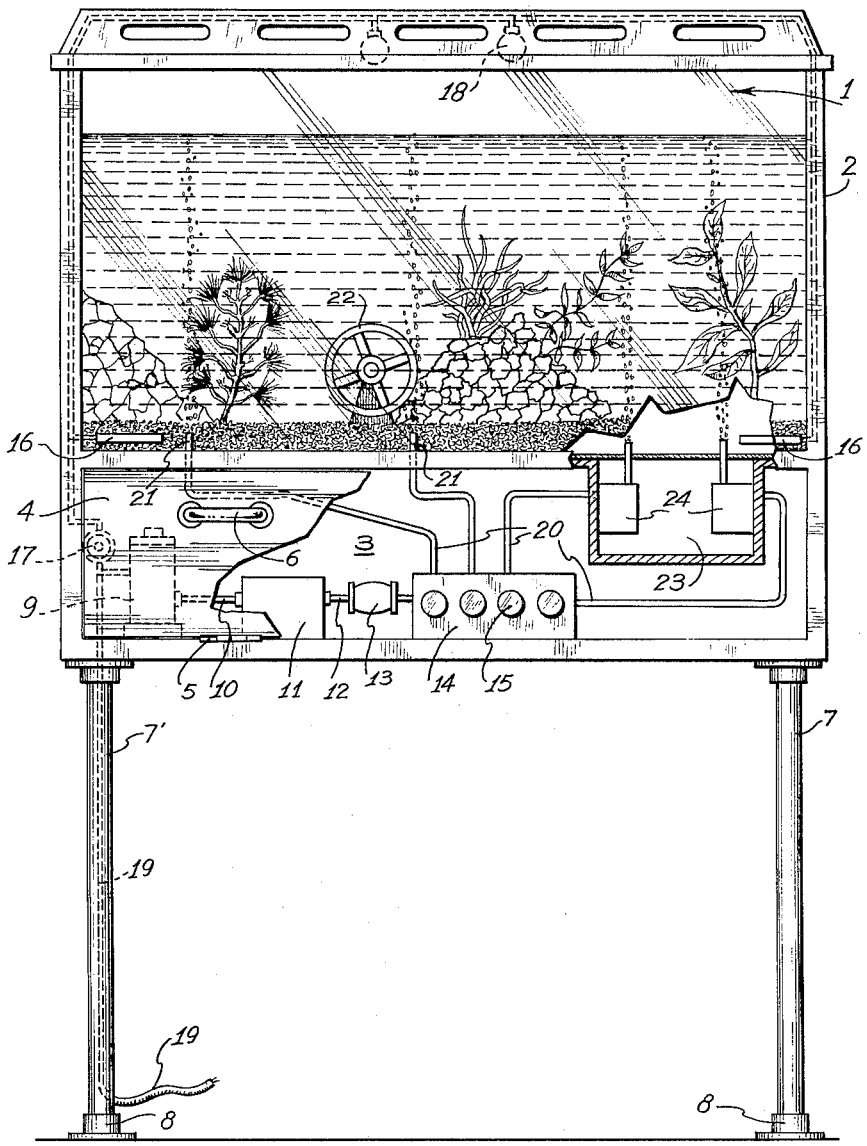
INVENTORS
GUADALUPE DOSAMANTES DE JOSE
ANA MARIA DOSAMANTES DE GARCIA
Atteys.

United States Patent Office 3,232,271
Patented Feb. 1, 1966

3,232,271
INTEGRAL UNITARY AQUARIUM
Guadalupe Dosamantes de José and Ana M. Dosamantes de Garcia, both of 15—9 Comonfort, Mexico City, Mexico
Filed Mar. 16, 1964, Ser. No. 351,972
Claims priority, application Mexico, Jan. 31, 1964, 75,654
4 Claims. (Cl. 119—5)

The present invention is related to aquariums, and more particularly it refers to aquariums of the type for domestic use, but the invention is not limited to the applications of the aquariums to domestic use, and its use can be generalized to aquariums for public display.

As it is well known, an aquarium generally consists of a tank or vessel which has one or more transparent walls so that the inhabitants of said tank or vessel can be observed from the exterior.

In order to maintain in good condition both the aquarium and its occupants, which are not only fishes, but a very wide variety of aquatic animals, aquatic plants, as well as any other kind of suitable ornaments, it is necessary, as is well known, to maintain a constant air stream in the water contained in the aquarium, in order that the water will be sufficiently oxygenated for the breathing of the occupants of said aquarium and for the natural carrying on of overall biological processes which might take place in said vessel.

It is also necessary, depending on the type of occupancy within the aquarium, to maintain the water at a more or less constant temperature, if good results are to be obtained.

It is also common to provide said aquariums with a suitable lighting, for the observation of the interior thereof, which lighting is used in some cases also, for ornamental purposes, in order to add some attractiveness to the aquarium.

In order to achieve the above, ducts through which air passes to be bubbled into the water of the aquarium are installed and these require pumps, ducts, valves, filters, and a good amount of equipment and fixtures which are generally bulky and require various specialized installations, which are very difficult to conceal so that the appearance of the equipment will not be in detriment to the general appearance of the aquarium as a whole.

This is difficultly achieved, and the nature of the aquariums has required the insertion, on the top, of ducts for bubbling air, or hoses for connecting with ornamental figures which are generally located within the aquariums, such as small divers, crustacea, or movable wheels and the like. Also, the heaters and corresponding thermostats for controlling said heaters, are generally immersed, suspended from the top of the aquarium, so that a great deal of the attractiveness and good appearance of the aquarium is spoiled, and the installation thereof is made difficult, this being one of the reasons why the aquariums have not been popularized in the degree which they might with the attractiveness they represent for most of the persons.

It is therefore an object of the present invention to provide a novel and improved unitary and integral aquarium, wherein it will only be necessary to connect a plug to a common receptacle, so that the aquarium might be put in condition for operation.

It is another object of the present invention to provide an aquarium of the above character, wherein a great variety of effects can be achieved, by the simple handling of a few control buttons, at the will of the user.

It is a further object of the present invention to provide an aquarium of the above described character and which will be also characterized in that all the elements to carry out a satisfactory operation thereof, will be completely concealed, improving the appearance of the assembly, due to the fact that all devices and elements to effect operation are completely out of the sight.

An additional object of the present invention is to provide an aquarium according to the above, which will be very simple to maintain in relation to the accessories and operational equipment.

It is another object of the present invention to provide an aquarium of the above character, which will also be provided with protectional devices for the operational elements thereof, which will assure that delicate elements such as pumps and the like will not suffer any damage even when one or more of the usual safety devices installed in the assembly fail.

The above and other objects and advantages will be more apparent from the following detailed specification of a preferred embodiment of a unitary integral aquarium according to the present invention, when said specification is taken in connection with the accompanying drawing wherein:

The single figure represents a front elevational view of a preferred embodiment of a unitary integral aquarium, built in accordance with the teachings of the present invention.

Having now more particular reference to the drawing, the unitary aquarium comprises a vessel 1, which in this illustrative case can be a glass vessel or built of any other suitable material, formed by a plurality of walls mounted in such a way that water leaks will be avoided, and secured by conventional processes, on an outer frame 2, comprised of metallic members which define a vessel adopting the general form of a prismatic box, said frame 2 projecting downwardly from the bottom of the aquarium, in order to define a lower cavity 3, which is completely closed at three sides thereof by means of metallic covers or any other suitable opaque material, having an attractive appearance, the remaining face or frontal face of the cavity 3 being closed by means of a cover 4 attached by means of hinges 5 to the lower part of the frame, and said cover 4 being provided in the embodiment illustrated, with handle 6 for its easy handling.

In the figure illustrated in the present invention, the outer assembly of the aquarium is completed by a plurality of tubular legs 7, which in the present case can be four, and these legs, as indicated, are tubular and hollow for an object which will be pointed out hereinafter; these tubular legs being provided at the lower end of supports or basis aid, of any conventional type.

At the interior of cavity or compartment 3, a conventional compressor pump 9 is disposed which forces air through a duct 10 which enters into a safety box 11, the object of this safety box 11, being more fully detailed hereinafter in the present specification. The air from said safety box leaves by duct 12 and passes through a check valve 13, however a plurality of check valves may be used for security from which it continues to a distribution manifold 14, which can be constituted by a plurality of three way valves 15, which in the described embodiment are four in number.

Also, at the bottom of the aquarium, but within the upper vessel, that is, the vessel which will contain the water and its occupants, one or more heaters 16 are arranged, which can be conveniently concealed by gravel, such as it is usual to place at the bottom of the aquariums.

Thermostat 17 is also present in order to control the operation of heater 16; finally, at the upper covered base of the aquariums, a pair of lamps 18 can be arranged in order to provide general lighting therefor.

The motor pump 9, as well as all the other electrical devices of the aquarium, are fed with electric power supplied through proper lead wires 19, which will pass concealed through one leg 7, this leg being as above indicated, hollow throughout its length, and can serve therefore in perfect manner as a duct for the above-mentioned object, the lead wire 19 leading finally to the exterior from the lower end of said leg, to continue therefrom, in any desired length, to an end where a conventional plug is arranged in order to be capable of insertion in any common electrical receptacle.

Lead wire 19, as indicated, not only feeds motor pump 9, but also, by means of branches and projections thereof, it will feed the other electrical devices such as heater 16, lamps 18, and thermostat 17, the branch feeding said accessories running in a completely concealed manner, within the members forming the frame, which can be also tubular, or otherwise concealed in any other conventional manner within the above mentioned structural members.

The pressurized air supplied by motor pump 9, as indicated, passes through the safety box 11 and the check valve 13, to a distribution manifold 14, which comprises, in the presently described embodiment, four three-way valves, which are connected to each other in series, and in one of the bypasses, to ducts 20, which will feed pressurized air to any one of the more or less common devices for aquariums which can be simply openings or mouths 21 for the feeding of air, or nozzles which will direct the stream of air bubbles against ornamental accessories such as a movable wheel which can be provided with paddles to be driven by the pressurized air current, transferring the rotatory motion to said wheel.

Ducts 20 can also be connected to proper holes made in a cavity or lower tank 23, coupled to the bottom of the aquarium, and said cavity serving to nest one or more filters 24, arranged in this manner under the level of water in order to displace the latter to the more convenient portion to decorate the aquarium. Filters 24 serve to filter both air and water, the air moving the water along with it.

Now, it has been observed that generally all usual check valves to be applied in aquariums, are not as reliable as they should be, and at any moment, perhaps because of the trapping of a foreign body, which can easily penetrate the air system, will not correctly perform, so that they will allow, in case of an interruption in the performance of the pump by any interruption of the electric power or other reason, the water to enter, driven by the hydrostatic pressure of the container of the upper portion of the aquarium, sometimes causing serious damage to the metallic precise mechanisms of the compact motor pumps used in aquariums.

For the above reason, the safety box 11 has been inserted in series with a pneumatic circuit, and said safety box comprises a closed and sealed vessel to which duct 10 from the motor pump is connected at a level very near the top, and duct 12 leaves from a corresponding level, through which the pressurized air continues its movement towards said distribution manifold.

In the case of interruption by any reason of the performance of the motor pump 9, and causing the possibility that the water might enter the pneumatic system, through the holes 21 and corresponding ducts 20, and the like, and in the case that said check valve 13 has not an effective action, the water that would otherwise enter, will have to first fill the safety box to a level corresponding to the inlet and outlet holes thereof, so as to enable it to pass towards the pump and, by means of an accurate calculation of the suitable volume for said safety box, a period of time can be provided so as to have enough security, which will be sufficient to effect all necessary repairs in the remainer of the system, therefore, removing the risk of damages of delicate parts of the mechanism of the aquarium.

While the present invention has been described in connection with a preferred embodiment thereof, it will be apparent for those skilled in the art that a great number of variations and modifications can be made, such as for instance, to make the electric power feed not necessarily through a hollow leg for the aquarium, but simply using to conceal the corresponding lead wire, an ornament, structural member, or ornamental member, suitable for this purpose, and modifying elements such as the cover for the aquarium, in order to mention just one example, this being able to be formed of two parts, one of them fixed and serving as support to the lighting conduits, and the other hinged to the latter by means of hinges or any other type of movable joint, which will allow to lift it for the required purposes; and it must be understood that said variations and modifications, must be considered within the true spirit and scope of the present invention, which is to be limited only as per the accompanying claims.

Having thus described our invention, what we consider as a novelty and desire to secure by Letters Patent is:

1. An aquarium comprising an upper chamber for housing fish and the like, a lower chamber housing operational equipment and accessories for the normal operation of the aquarium, said operational equipment including an air pump for pressurizing and feeding air bubbles into water contained in the upper chamber, a pneumatic duct system in said lower chamber and leading upwardly to connect said pump to at least one opening below water level in said upper chamber, and a safety box located in said lower chamber and in said duct system between the upper chamber and the pump for trapping liquid to prevent water passing through said duct system from said upper chamber to said pump upon stoppage of said pump.

2. An aquarium according to claim 1, wherein said safety box is an enclosed box serving as a leak-proof reservoir with an inlet port connected to said pump and an outlet port, said operational equipment comprising a check valve in said duct system before said opening to the upper chamber and connected to said outlet port, said check valve being constructed to prevent flow of liquid toward said box, both said ports being located near the top of said box and the box having a volume such that, in the case of failure of the check valve, water from the upper chamber which otherwise would enter the pump must first collect in such box and overflow the said inlet port, whereby to provide a safety period of time during filling of said box proportional to the volume of the box.

3. An aquarium according to claim 2, wherein is further provided an additional chamber within said lower chamber and fixed to the bottom of said upper chamber, and at least one filter housed within said additional chamber, and inserted in said pneumatic duct system ahead of said opening to the upper chamber to filter pressurized air and water.

4. An aquarium according to claim 3, wherein said operational equipment further comprises electric heaters, a thermostat and lamps, and electrical conductors concealed within structural members forming and supporting said upper and lower chambers for feeding electric power to said pump, heaters, thermostat and lamps.

(References on following page)

References Cited by the Examiner

UNITED STATES PATENTS

| | | | |
|---|---|---|---|
| 568,145 | 9/1896 | Sanderson | 137—171 |
| 1,109,193 | 9/1914 | Zistel | 119—5 |
| 1,156,515 | 10/1915 | Barba | 119—5 |
| 1,162,422 | 11/1915 | Wenig. | |
| 2,253,516 | 8/1941 | Haldeman | 119—5 |
| 2,302,336 | 11/1942 | MacDonald | 119—2 |
| 2,424,879 | 7/1947 | Dach | 137—203 X |
| 2,594,474 | 4/1952 | McGrath | 119—5 |
| 2,672,845 | 3/1954 | Schneithorst | 119—5 |
| 2,732,341 | 1/1956 | Huff | 119—5 X |
| 2,776,642 | 1/1957 | Sepersky | 119—5 |
| 2,847,973 | 8/1958 | Pugh | 119—5 |
| 2,890,680 | 6/1959 | Malkin | 119—2 |
| 3,018,758 | 1/1962 | Arnould | 119—5 |
| 3,146,195 | 8/1964 | Berardi | 119—5 X |

SAMUEL KOREN, *Primary Examiner.*
ALDRICH F. MEDBERY, *Examiner.*